UNITED STATES PATENT OFFICE.

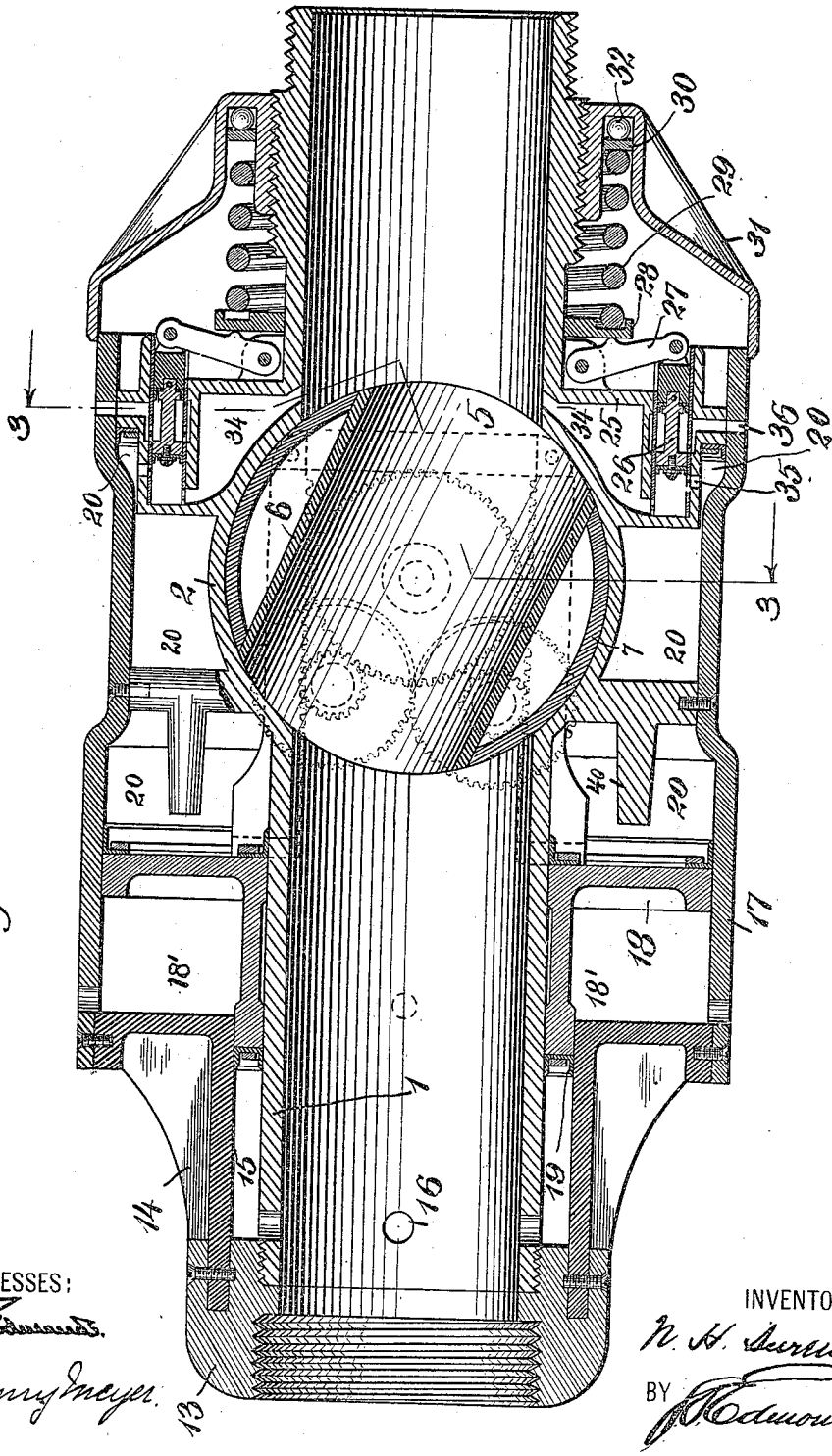

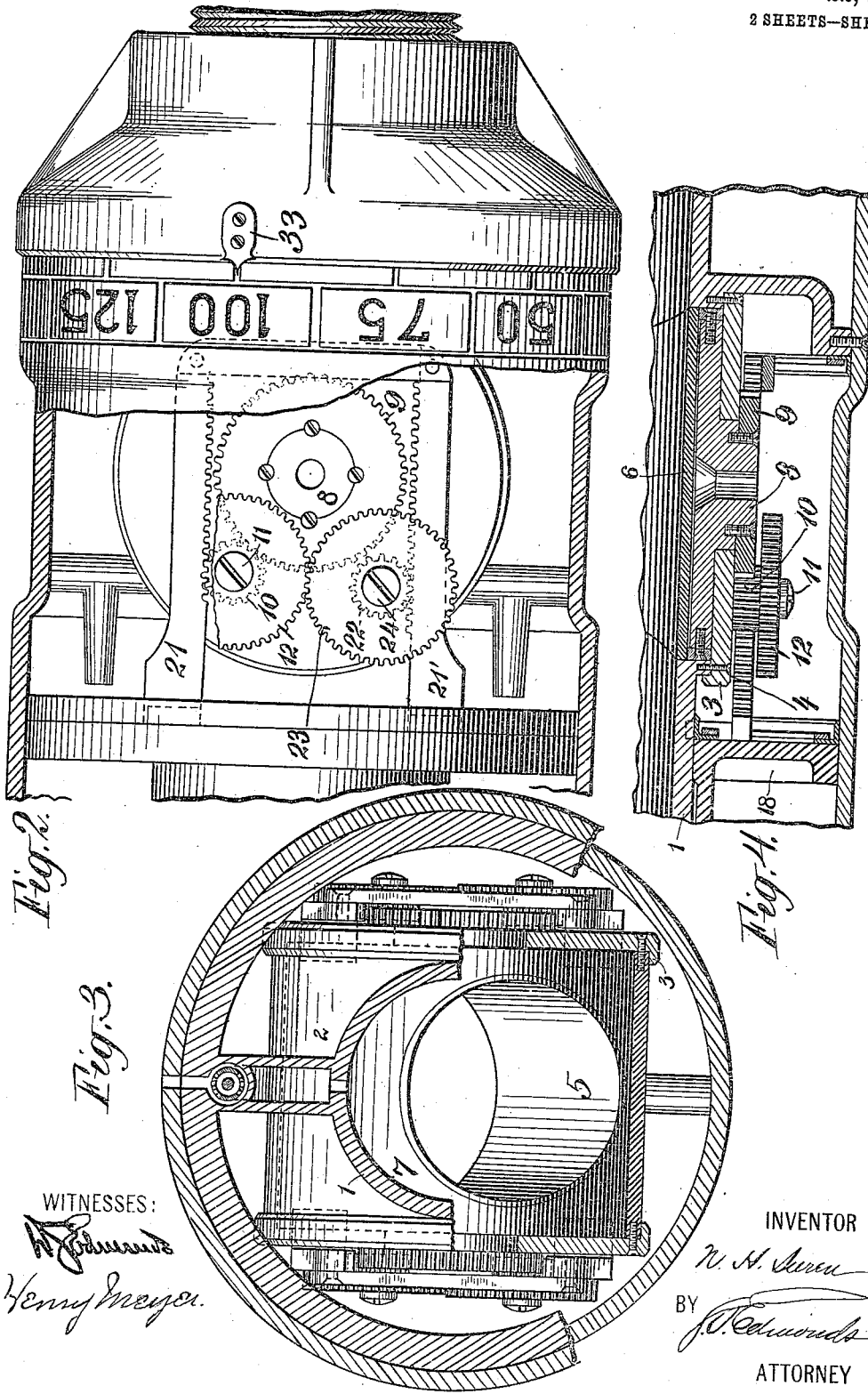

NATHAN H. SUREN, OF NEEDHAM, MASSACHUSETTS, ASSIGNOR TO THE GAMEWELL FIRE ALARM TELEGRAPH COMPANY, OF NEW YORK, N. Y., A CORPORATION OF NEW YORK.

VALVE.

952,768.     Specification of Letters Patent.     Patented Mar. 22, 1910.

Application filed April 10, 1909. Serial No. 489,197.

*To all whom it may concern:*

Be it known that I, NATHAN H. SUREN, a citizen of the United States, residing at Needham, in the county of Norfolk and State of Massachusetts, have invented certain new and useful Improvements in Valves, of which the following is a specification.

This invention is directed to the provision of an improved form of pressure-controlling valve adapted to regulate the pressure of the fluid passing therethrough.

The invention may be utilized in valves differing in construction and adapted for use in various ways but it is of special utility in a system of distribution of water for quenching fires. In some cases systems of water distribution have been provided in which the water is supplied at the hydrants at high pressure and in using the water from such a system it often becomes desirable to be able to regulate the pressure at which the water is used.

In accordance with my invention a valve is provided which may be inserted at any desired point in a hose or between a hydrant and the end of a hose, and this valve may be so set that it will reduce the pressure of the water passing through the hose or supplied from the hydrant, to a pressure corresponding to that for which the valve is set.

I have illustrated the preferred embodiment of my invention in the accompanying drawings in which—

Figure 1 is a longitudinal section of the valve, Fig. 2 is a sectional elevation of a portion of the valve shown in Fig. 1, Fig. 3 is a transverse section on line 3—3 of Fig. 1 and Fig. 4 is a sectional detail view.

Referring to these drawings, a tubular member is shown at 1, this having its walls intermediate the ends of the member formed to provide a cylindrical chamber 2, to the ends of which annular members 3 are secured by screws 4. Within this cylindrical chamber is a rotatable valve-member 5 consisting of a tube 6 extending through a cylindrical drum 7 having heads 8 secured to the ends thereof. The parts of the movable valve-member, namely tube 6, drum 7 and heads 8, are secured together in such manner that the joints between them are water-tight. To each of the heads 8 of the movable valve-member is secured a concentric gear 9 meshing with a pinion 10 rotatable upon a stub shaft 11 which is secured to the annular member 3. Rigidly secured to pinion 10 and rotatable upon the shaft 11 is a gear 12.

To the inlet end of the valve is secured a head block 13, this being interiorly threaded at one end to coact with threads on the end of the tube 1 and at the other end to provide means for rigidly connecting the valve to the hydrant or the end of a length of hose. The head block 13 is also formed to coact with a cylinder ring 14, this ring having a cylindrical portion which is of somewhat greater interior diameter than the exterior diameter of the tube 1 near the inlet end of the valve so that a chamber 15 is provided between tube 1 and ring 14, this chamber being connected by openings 16 with the interior of tube 1. At one end of ring 14 is a flange to which is secured one end of a casing 17 the other end of which is secured to outwardly extending portions formed on tube 1 near the outlet end thereof. Within the chamber 15 and the larger chamber provided between the tubular member 1 and the casing 17 is a piston 18 the opposite ends of which have suitable gaskets 19 secured thereto. One end of this piston is movable within the chamber 15, as shown in Fig. 1, and the other end thereof is movable within the chamber 20, the movement of the piston to the right in Fig. 1 being limited by stops 40 formed on parts projecting from the tubular member 1. Openings are provided in the casing 17 to permit the free entrance and exit of air to the chamber 18' back of the piston 18. The reciprocating piston 18 is connected with the rotatable valve-member 5 so that these two parts move together. For this purpose the piston 18 has racks secured thereto meshing with the pinions 10, which mesh with the gears 9 on the valve-member. In Fig. 2 one of these racks is shown at 21, this rack meshing with the gear 10. In order to insure a smooth movement of the parts I prefer to employ two racks at each end of the movable valve-member, both of these racks being connected to the valve-member. Thus, in Fig. 2 an additional rack 21' is shown opposite the rack 21, this meshing with a pinion 22 which with a gear 23 is mounted upon a stub shaft 24 similar to the stub shaft 11. The gear 23 meshes with the gear 12 but the pinion 22 is spaced apart slightly from the gear 9.

In the parts 25 projecting from the tubular member 1 near the outlet end of the valve are formed small cylindrical chambers preferably provided with suitable linings or bushings and adapted to receive reciprocating valve-members 26. These valve-members are pivotally connected at their outer ends to levers 27, pivotally mounted upon tubular member 1. These levers are provided with contact points which engage a ring 28 against which one end of a helical spring 29 bears; the other end of spring 29 bears against a ring 30, lying in an annular groove in a cap 31, a plurality of balls 32 being placed between ring 30 and the bottom of this groove. Cap 31 is interiorly threaded to coact with threads on the exterior of the outlet end of tubular member 1, additional threads being provided on member 1 to facilitate connecting the outlet end of the valve to a length of hose or a nozzle. At its opposite end the edge of cap 31 overlaps the edge of casing 17 and to this portion of the cap is secured an index 33 adapted to coact with a suitable scale on the casing 17, as shown in Fig. 2. The chambers in which the pistons 26 are received are each connected at one end thereof with the interior of the tubular member 1 by means of a passageway 34. When the pistons 26 are retracted to the positions in which they are shown in Fig. 1, a passageway is provided from the interior of tubular member 1 to the chamber 20 on one side of the piston 18 by means of the passageway 34 and a port 35 in the wall of the cylinder of the piston 26. Throughout a portion of its length each of the pistons 26 is of reduced diameter so that a chamber is provided around this reduced portion and when the piston has been moved to the left in Fig. 1, a passageway is provided from the port 35 through this chamber to a port 36 leading to the exterior of the valve.

With the valve thus constructed the operation is as follows: Suppose that the rotatable valve-member 5 is in such position that the tube 6 is at a right angle to the opening through the tubular member 1, that the valve is attached at its inlet end to a hydrant of a high pressure water system and has one end of a length of hose secured to its outlet end, and that the cap 31 has been turned to such position that the index 33 points to the position on the scale indicating the pressure of water which is desired. If the hydrant be then turned on, water will flow into the tubular member 1 and pass through the openings 16, into the chamber 15 and the pressure of this water acting upon the small end of the piston 18 will push the piston to the right in Fig. 1 thereby rotating the valve-member 5 by means of racks 21 and 21' and the gearing connecting them to the gears 9. The valve will thus be opened and the water will pass through the tube 6 to the outlet end of the valve. As the pressure at the outlet end of the valve rises, the water will enter the passageways 34 and exert a pressure against the ends of the pistons 26 so that these pistons will be moved back against the tension of spring 29 until they uncover the ports 35 and allow the water to pass through these ports into the chamber 20 and against the large end of piston 18. As the pressure within the chamber 20 increases, the movement of piston 18 to the right and the corresponding opening movement of the valve-member 5 will be checked, and then the piston and valve-member will be moved slightly in the opposite direction to partially close the valve for the reason that the pressure of the water in chamber 20 is exerted upon a larger area of the piston 18 than the pressure of the water in chamber 15. This closing movement continues until the water pressure at the outlet end of the valve is sufficiently reduced to cause the spring 29 to push the pistons 26 to the left in Fig. 1, until those pistons close the ports 35, thereby preventing the entrance of any more water into the chamber 20 and thus arresting further movement of piston 18. In practice I have found that the pressure at the outlet end of the valve rises but a very few pounds above that for which the valve is set before it is reduced to the proper point. If the use of water be discontinued by closing the nozzle at the end of the hose which is connected to the outlet end of the valve, the pressure of the water at the outlet end of the valve will begin to rise; when this pressure exceeds by a few pounds that for which the cap 31 has been set, the pistons 26 will be forced back against the tension of spring 29 until the ports 35 are uncovered whereupon water will enter the chamber 20 by means of the passageways 34 and ports 35 and move piston 18 to its extreme position at the left in Fig. 1, thereby closing the valve. As a result of this, the hose is not subjected to the strain of the high pressure while it is not being used to supply water. If at any time the pressure of the water at the inlet end of the valve should drop, the pressure upon the pistons 26 would be correspondingly decreased and the spring 29 would move pistons 26 to the left in Fig. 1 until the ends of the pistons were carried past the ports 35, whereupon an exit for the water in chamber 20 would be provided through the ports 35 and 36. The water in chamber 20 would then be forced out through these ports by the piston 18 actuated by the pressure thereon of the water in chamber 15 and as piston 18 moved to the right in Fig. 1 thus, the valve-member 5 would be turned to open the passageway through the valve to a greater extent and thus, by permitting the water to pass through the valve more freely, raise the pressure at the outlet end of the valve to that which was desired.

Having described my invention, what I claim as new therein and desire to secure by Letters Patent of the United States is:

1. A valve having an opening therethrough, a movable valve-member in said opening for controlling the passage of fluid therethrough, a member movable in response to changes of pressure thereon, connections between said member and said movable valve-member, a passageway leading from said opening on one side of said valve-member to one side of said member, a second passageway leading from said opening on the other side of said valve-member to the opposite side of said member, a third passageway leading from one side of said member to the exterior of the valve, and means for controlling the flow of fluid in said second and third passageways, substantially as set forth.

2. A valve having an opening therethrough, a movable valve-member in said opening for controlling the passage of fluid therethrough, a member movable in response to changes of pressure thereon, connections between said member and said movable valve-member, a passageway leading from said opening on one side of said valve-member to one side of said member, a second passageway leading from said opening on the other side of said valve-member to the opposite side of said member, a third passageway leading from one side of said member to the exterior of the valve, means for controlling the flow of fluid in said second and third passageways, a spring acting upon said means, and means for adjusting the tension of said spring, substantially as set forth.

3. A valve having an opening therethrough, a movable valve-member in said opening for controlling the passage of fluid therethrough, a member movable in response to changes of pressure thereon, connections between said member and said movable valve-member, a passageway leading from said opening on one side of said valve-member to one side of said member, a second passageway leading from said opening on the other side of said valve-member to the opposite side of said member, a third passageway leading from one side of said member to the exterior of the valve, and means for simultaneously closing said second passageway and opening said third passageway, substantially as set forth.

4. A valve having an opening therethrough, a movable valve-member in said opening for controlling the passage of fluid therethrough, a member movable in response to changes of pressure thereon, connections between said member and said movable valve-member, a passageway leading from said opening on one side of said valve-member to one side of said member, a second passageway leading from said opening on the other side of said valve-member to the opposite side of said member, a third passageway leading from one side of said member to the exterior of the valve, and a controlling valve movable to open and close said second and third passageways, substantially as set forth.

5. A valve having an opening therethrough, a movable valve-member in said opening for controlling the passage of fluid therethrough, a member movable in response to changes of pressure thereon, connections between said member and said movable valve-member, a passageway leading from said opening on one side of said valve-member to one side of said member, a second passageway leading from said opening on the other side of said valve-member to the opposite side of said member, a third passageway leading from one side of said member to the exterior of the valve, a controlling valve movable into position for opening said second passageway and closing said third passageway or into position for closing said second passageway and opening said third passageway, a spring acting upon said controlling valve, and means for regulating the tension of said spring, substantially as set forth.

6. A valve having an opening therethrough, a movable valve-member in said opening, an operating device connected to said valve-member and responsive to changes of pressure, a passageway from one side of said device to said opening on one side of the valve-member therein, a passageway from the other side of said device to said opening on the other side of said valve-member, and a controlling valve in said last-named passageway, the movable member of which is adapted to assume three positions in one of which it opens said passageway, in another of which it closes said passageway and in the third of which it opens a passageway from said operating device to the exterior of the valve, substantially as set forth.

7. A valve having an opening therethrough, a movable valve-member therein, a member connected to said valve-member and having two portions one of which is of greater area than the other, a passageway from said opening on one side of said valve-member to said portion of lesser area, a passageway from said opening on the other side of said valve-member to said portion of greater area, and a valve controlling said last-named passageway, substantially as set forth.

8. A valve having an opening therethrough, a movable valve-member therein, a member connected to said valve-member and having two portions one of which is of greater area than the other, a passageway from said opening on one side of said valve-member to said portion of lesser area, a passageway from said opening on the other side of said valve-member to said portion of greater area, a valve controlling said last-named passageway, a spring for actuating said valve, and means for regulating the tension of said spring, substantially as set forth.

9. A valve comprising a tubular member, a casing surrounding the same, an annular piston movable upon said tubular member and within said casing, a valve-member within said tubular member connected to said piston, passageways from opposite sides of said piston to said tubular member on opposite sides of said valve-member and a controlling valve in one of said passageways, substantially as set forth.

10. A valve comprising a tubular member, a casing surrounding the same, an annular piston movable upon said tubular member and within said casing, said piston having one end thereof of greater area than the other, a valve-member within said tubular member connected to said piston, passageways from opposite ends of said piston to said tubular member on opposite sides of said valve-member, a controlling valve in one of said passageways, a spring for actuating the movable member of said controlling valve, and means for adjusting the tension of said spring, substantially as set forth.

11. A valve comprising a tubular member, a casing surrounding the same, an annular piston movable upon said tubular member and within said casing, a valve-member within said tubular member connected to said piston, passageways from opposite sides of said piston to said tubular member on opposite sides of said valve-member, a controlling valve in one of said passageways for opening and closing the same, and a passageway from one side of said piston to the exterior of the valve adapted to be opened and closed by said controlling valve, substantially as set forth.

This specification signed and witnessed this 7th day of April, 1909.

NATHAN H. SUREN.

Witnesses:
WARREN H. HOEY,
DANIEL W. WHITE.